United States Patent [19]

Owens

[11] 4,087,975
[45] May 9, 1978

[54] OCEAN THERMAL PLANT

[75] Inventor: Lester J. Owens, Titusville, Fla.

[73] Assignee: The United States of America as represented by the Administrator of the National Aeronautics and Space Administration, Washington, D.C.

[21] Appl. No.: 782,481

[22] Filed: Mar. 29, 1977

[51] Int. Cl.² ............................................. F03G 7/04
[52] U.S. Cl. ........................................ 60/641; 60/671
[58] Field of Search .................. 60/641, 651, 671, 531

[56] References Cited

U.S. PATENT DOCUMENTS

| 2,006,985 | 7/1935 | Claude et al. | 60/641 |
| 3,312,054 | 4/1967 | Anderson et al. | 60/531 |
| 3,805,515 | 4/1974 | Zener | 60/641 |

FOREIGN PATENT DOCUMENTS

| 69,980 | 1/1959 | France | 60/641 |

Primary Examiner—Allen M. Ostrager
Assistant Examiner—Stephen F. Husar

Attorney, Agent, or Firm—James O. Harrell; John R. Manning

[57] ABSTRACT

An ocean thermal plant consisting of a floating energy converter utilizing large volumes of sea water to produce electrical power. In this plant, a fluid working medium is pumped to an evaporator where it is heated by a flow of warm surface sea water. The fluid in liquid form boils to a pressurized gas vapor which is routed to drive a turbine that, in turn, drives a generator for producing electricity. The gas vapor then enters a condenser immersed in cold sea water pumped from lower depths. The gas vapor condenses to its original liquid form and is then pumped to the evaporator to repeat the cycle. Modular components can be readily interchanged on the ocean thermal unit and inlet pipes for the sea water are provided with means for maintaining the pipes in alignment with the oncoming current. The modular construction allows for the testing of various components to provide a more rapid optimization of a standardized plant.

13 Claims, 8 Drawing Figures

OCEAN THERMAL PLANT

ORIGIN OF THE INVENTION

The invention described herein was made by an employee of the United States Government and may be manufactured and used by or for the Government for governmental purposes without the payment of any royalties thereon or therefor.

BACKGROUND OF THE INVENTION

The present invention relates to an ocean thermal power plant and, more particularly, to a modularly constructed ocean thermal power plant.

It has become apparent in recent years that sources of energy other than petroleum and coal must be utilized for supplying some of the energy needs of mankind. There are many alternate forms of energy, however, the problem lies in economically and efficiently converting this energy into a workable source of power.

While solar energy is one of the most abundantly and readily available sources of energy for the earth, it has many limitations as a result of the means and methods of converting it into a usable power supply. First, it has to be collected which generally requires construction of collectors for absorbing the energy. The collectors are used for heating fluids and/or air that are generally utilized as sources of heat for heating homes and water.

The largest natural collector of solar energy on the earth are the oceans and large bodies of water. These bodies of water are heated up by the sun and, as a result, the surface water is much warmer than water at deeper depths. Several proposals have been presented for utilizing the difference in temperature of the surface sea water and the temperature at greater depths for operating power plants. One such power plant is disclosed in the March, 1976, *National Geographic* magazine, Volume 149, No. 3. On page 388, of this magazine there is disclosed a power plant which utilizes evaporators, turbine generators and condensers. The warm sun heated surface water which is about 80° F. flows through an evaporator to boil propane or ammonia into vapor which is piped to the turbines. This gas is used for driving the turbine generators for generating electricity. After driving the turbine generators to produce electricity, the vapor is condensed by cold water back into a liquid and recycled. The power plant extends approximately 1500 feet below the surface wherein the water is approximately 40° F. This cold water is pumped through a telescoping pipe to the condenser and then discharged. Electricity generated by the power plant is fed by cables to adjacent land. Other sea water power plants are disclosed in U.S. Pat. Nos. 3,312,054, 3,896,622, 3,805,515 and 3,953,971.

SUMMARY OF THE INVENTION

The invention includes an ocean thermal power plant which generates electrical power by utilizing the difference in temperature between naturally heated surface water and cold water from greater depths. A vertically extending tubular housing is provided with an opening adjacent the top thereof for receiving warm sea water from adjacent the surface. It also has an opening adjacent the bottom for receiving colder water from greater depths. Provided in the tubular housing is a power generating plant having a turbine which is rotated by a working fluid. The turbine, in turn, rotates an electrical generator which generates electricity. An evaporator is provided for heating the working fluid with the warm sea water causing the working fluid to change from a liquid to a gas for rotating the turbine. A condenser is provided for cooling exhaust gases from the turbine with the cold sea water for changing the exhaust gases back to a liquid. A rotatable tubular deflecting hood is carried adjacent the bottom of the tubular housing. Vane means is carried on the rotatable deflecting hood for rotating the hood so as to maintain it facing the flow of water at that particular depth. The evaporators and condensers are carried within modular housings that can be readily attached and removed from the side of the main tubular housing so that such can be readiy interchanged for maintenance and servicing. This modular construction also permits different types of evaporators and condensers to be tested under actual operating conditions to determine which ones are most suitable.

A warm water inlet housing is carried adjacent the top of the main vertical housing in communication therewith. A pivotal duct is carried on the outer end of the warm water inlet housing. A vane means is provided on the outer end of the pivotal duct for aiding in maintaining the warm water inlet duct facing the oncoming currents. The entire ocean thermal plant is anchored and held in position by cables so that the warm water inlet tube normally faces the incoming currents. By permitting the cold and warm water inlets to pivot so as to face the incoming flow of water, a significant amount of energy is captured for aiding in moving the water through the evaporators and condensers utilized in the system.

Accordingly, it is an important object of the present invention to provide an ocean thermal power plant which utilizes the ocean current for moving warm and cold water through the various components forming part of the power plant.

Another important object of the present invention is to provide an ocean thermal power plant which is modular in construction so that the various components forming parts of the power plant can be readily exchanged for servicing and maintenance.

Another important object of the present invention is to provide an ocean thermal power plant wherein the various components thereof are equipped with biofouling means which sprays fluid under pressure on rows of tubes extending through components such as the condenser and the evaporator for dislodging marine growth therefrom.

Another important object of the present invention is to provide an ocean thermal power plant which is modular in construction to allow for the testing of various components to provide a more rapid optimization of a standardized plant.

These and other objects and advantages of the invention will become apparent upon reference to the following specification, attendant claims, and drawings.

DESCRIPTION OF THE PREFERRED EMBODIMENT

Figure 1:
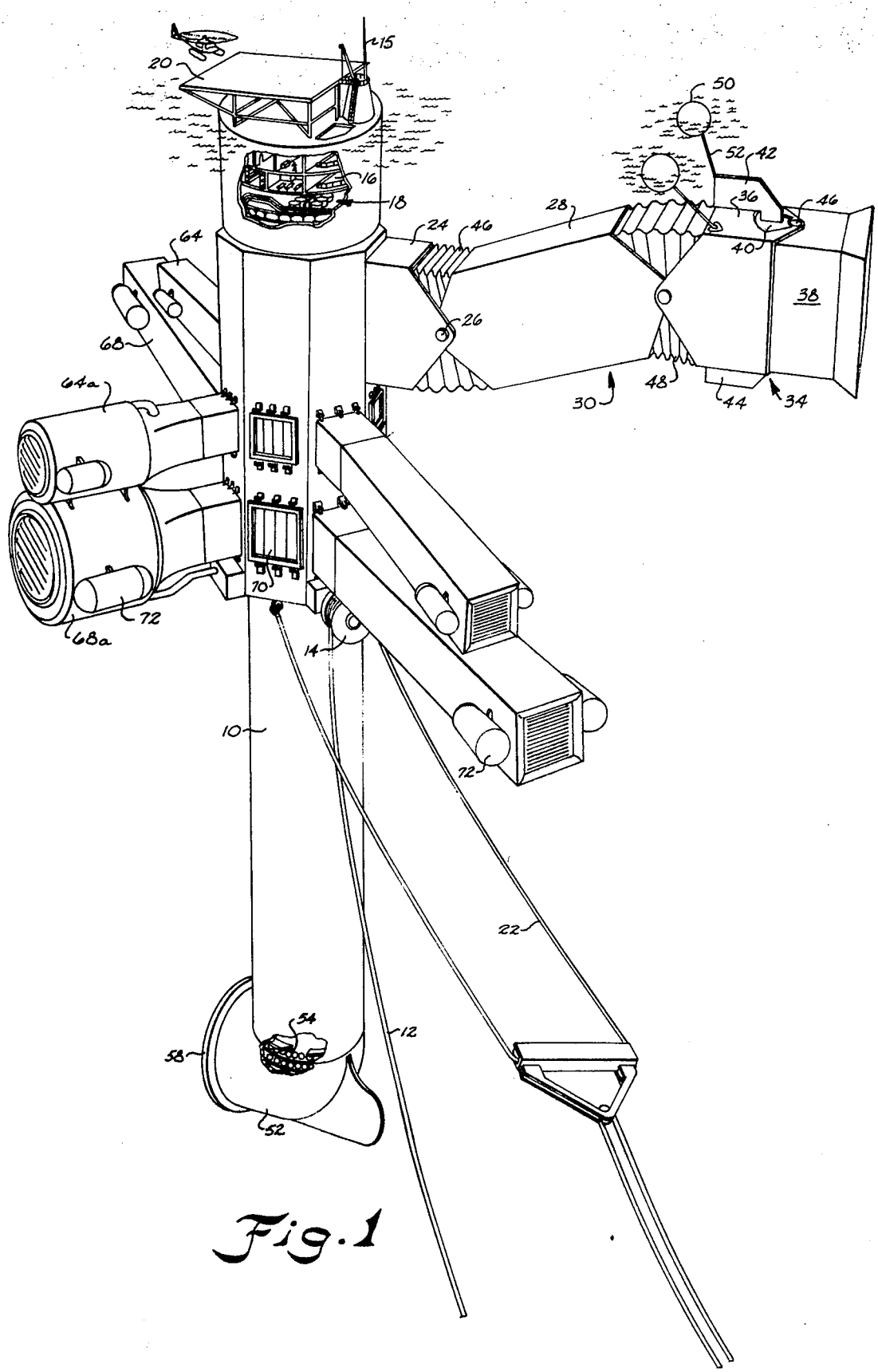
FIG. 1 is a perspective view illustrating an ocean thermal plant constructed in accordance with the present invention.
Figure 3:
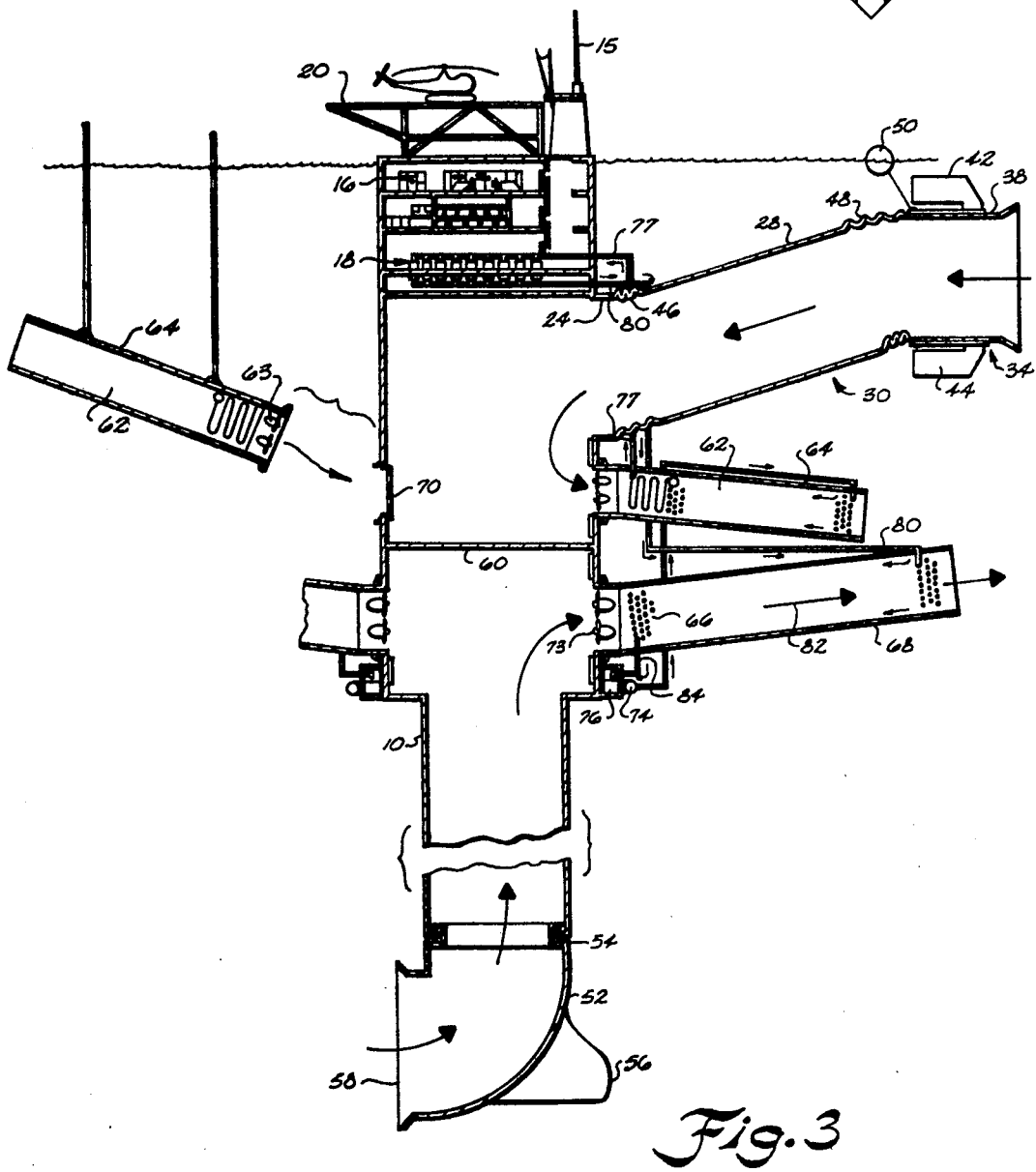
FIG. 3 is a sectional view of the ocean thermal plant shown in FIG. 1.
Figure 4:
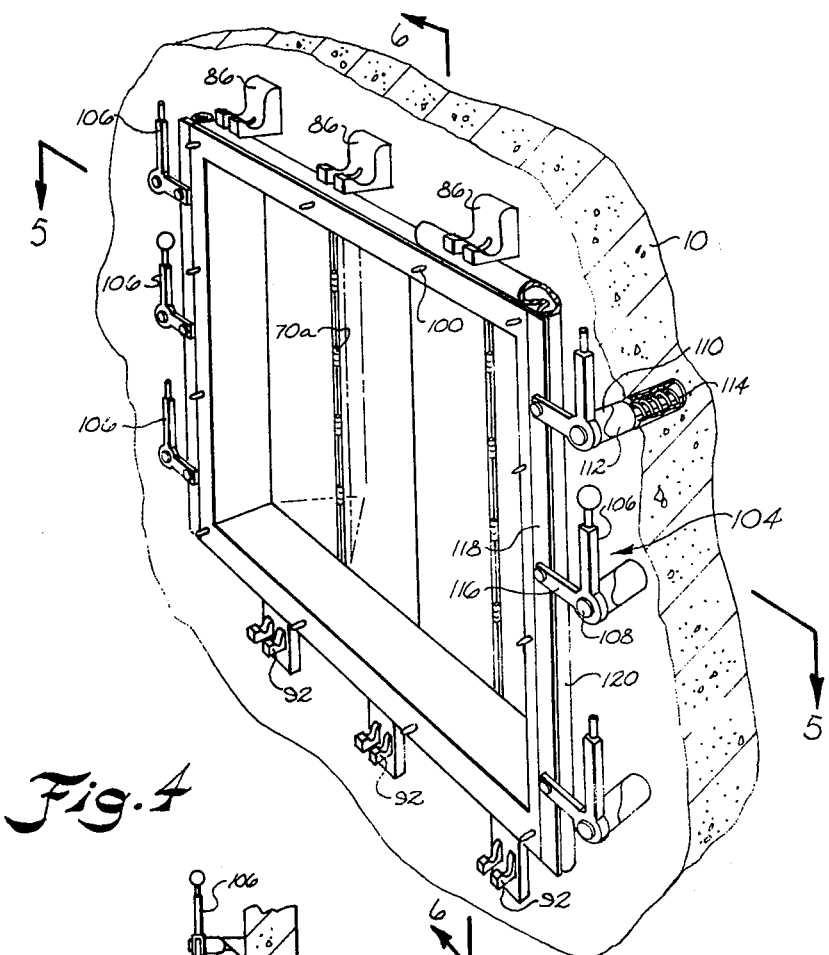
FIG. 4 is an enlarged fragmentary perspective view illustrating one of the doors provided on the ocean thermal plant.

An ocean thermal power plant constructed in accordance with the present invention is illustrated in FIGS. 1 and 3. The plant includes an elongated vertically extending housing 10 which may be constructed of any suitable material such as concrete. In order to make the vertically extending tubular housing 10 buoyant, in one particular embodiment, it is constructed of concrete with a foam plastic inserted therein. It is to be understood, of course, that instead of adding foam plastic to the concrete, the entire housing can be equipped with buoyancy tanks mounted on the side. It is desired that the housing be buoyant enough so that it is necessary to pull it down into the ocean by means of a cable 12 that has a lower end connected to an anchor and an upper end connected to a power operated winch 14.

When the ocean thermal power plant is at the desired location, the winch 14 is used for tightening the cable to thereby pull the entire plant down so that only an upper portion of the plant extends above the water. In this partially submerged position, the plant is stabilized against movement otherwise caused by the waves. It is to be understood that the upper portion of the plant normally is equipped with hatches so that such can be readily sealed off. In case of a hurricane or the like, the entire ocean thermal plant may be pulled beneath the surface by the winch 14. While the plant is submerged, a snorkle breathing system 15 allows unimpeded operation.

Adjacent the upper portion of the vertically extending tubular housing 10 are the living quarters 16 for the operators. Also carried in the upper portion of the vertically extending housing in a compartment are the turbines and generators designated generally by reference character 18. Positioned on top of the ocean thermal plant is a helicopter port 20 upon which helicopters can land for transporting crew members to and from the plant. Another swivel trapeze-type mooring system 22 has one end connected to the ocean thermal plant and the other end connected off at a horizontal distance to an anchor that may be as much as 4 miles away. Such enables the ocean thermal plant to remain at a relative position against the current or flow of sea water.

Positioned adjacent the top of the housing 10 is an inlet opening from which tubular member 24 extends. Connected to an outer end of tubular member 24 by means of pins 26 is an arm 28 of a warm water inlet pipe generally designated by reference character 30. The other end of the arm 28 is connected by means of pivots 32 to an outer pivotal housing 34. The outer pivotal housing 34 includes two tubular members 36 and 38. The tubular member 36 has an arcuate slot 40 provided in an upper and lower wall thereof. Extending through this arcuate slot 40 are vanes 42 and 44 which have a lower end thereof connected to the outer extension 38. These vanes cause the outer extension to pivot about pivot point 46 for maintaining the outer opening in alignment with the incoming current.

Positioned between tubular member 24 and tubular member 28 is a flexible joint 46 which may be constructed of any suitable material such as nylon coated with neoprene. A similar flexible joint 48 is positioned between the intermediate arm 28 and the tubular member 34. These flexible joints permit the outwardly extending warm water pipe to be raised and lowered so as to seek out the most desired temperature and current level.

Ballast tanks 50 are connected by means of cables 52 to the outer end of the warm water inlet tube 34. These ballast tanks may be of any suitable construction and, in one embodiment, be equipped with a winch for letting out and winding up the cables for varying the depth of the warm water tube. In other types of systems, the depth may be varied by varying the amount of water and air within the ballast tanks.

A rotating tubular water deflecting hood 52 is carried adjacent the bottom of the tubular housing 10 and has an upper end communicating therewith. The tubular water deflecting hood is in the shape of an elbow so that the inlet thereof is in a horizontal plane and the outlet which is coupled to the tubular member 10 is in the vertical direction. Any suitable bearings such as illustrated at 54 may be provided between the lower end of the tubular housing 10 and the rotatable tubular water deflecting hood 52 for permitting the hood to be rotated. In the embodiment illustrated, suitable bearing means are provided between a flange carried on the upper end of the hood and an inwardly extending flange provided on the lower end of the tubular housing 10.

Means, such as a rearwardly extending vane 56 is carried on the water deflecting hood for maintaining the outwardly extending end 58 of the hood facing the flow of the surrounding water so as to direct the cooler water into a lower portion of the tubular housing 10. It is to be understood, of course, that the depth that the tubular housing extends would vary with the particular location and application of the ocean thermal plant. However, it is anticipated that a distance between the upper warm water pipe and the lower cold water pipe of approximately 1200 feet would be sufficient to provide an efficient ocean thermal plant system utilizing temperature differentials for generating electricity.

The upper portion of the housing 10 is sealed from the lower portion by a horizontally extending partition 60. The purpose of this is to isolate the warm water flow which is coming in the upper tubular member 34 from the cold water member which is coming in through the lower hood 52. An evaporator 62 is carried within a modular member 64 which is connected to an opening or inlet provided in the side of the vertical housing so that the warm water flowing into the warm water inlet pipe 30 can be directed by means of pumps 63 through the evaporator for heating a working fluid. The working fluid may be any suitable working fluid which changes from a fluid to a gas between the temperature differentials of the water entering the lower hood 52 and the warm water entering the upper inlet pipe 30. It is anticipated that many different fluids could be utilized and three suitable liquids are ammonia, freon, and propane. This working fluid is circulated through tubes provided in the modular member 64 for being converted to a gas by the warm water flowing therethrough. The details of the evaporator are not disclosed since such is well known and could be constructed in a conventional manner for a power plant. A condenser 66 is also carried within a modular housing so that such can be attached to an opening provided in the wall of the tubular housing means 10 below the horizontal partition 60. This is to permit the cold water coming into the bottom of the housing 10 to be pumped by means of any suitable conventional pump 73 into the modular housing and in and around the pipes extending therethrough for cooling the gases being expelled from the turbine generators 18 and for converting the working fluid back to a liquid state.

As illustrated on the left in FIG. 3 of the drawing, an evaporator modular housing 64 is being lowered into position for placement over one of the doors 70 provided in the walls of the tubular housing 10 to which the various modular housings incorporating the condensers and evaporators may be positioned. The modules 64 and 68 are equipped with flotation cells 72 to ease underwater handling and to minimize the stresses that will normally occur at the interface junction of the modular housings and the vertical extending housing 10. The amount of buoyancy can be adjusted by varying the ratio of air to water contained in the rigid cells 72, i.e., add air to expel water thus increasing support or release air allowing more water to enter, to decrease upward force.

Evaporators 64a and condensers 68a modules are of different shapes and construction may be utilized with the power plant as long as there is a proper interface with the doors 70. This modular construction allows competitive designs and improvements in evaporators, condensers and other components to be introduced and evaluated without major disruption of power production in the plant.

Figure 2:
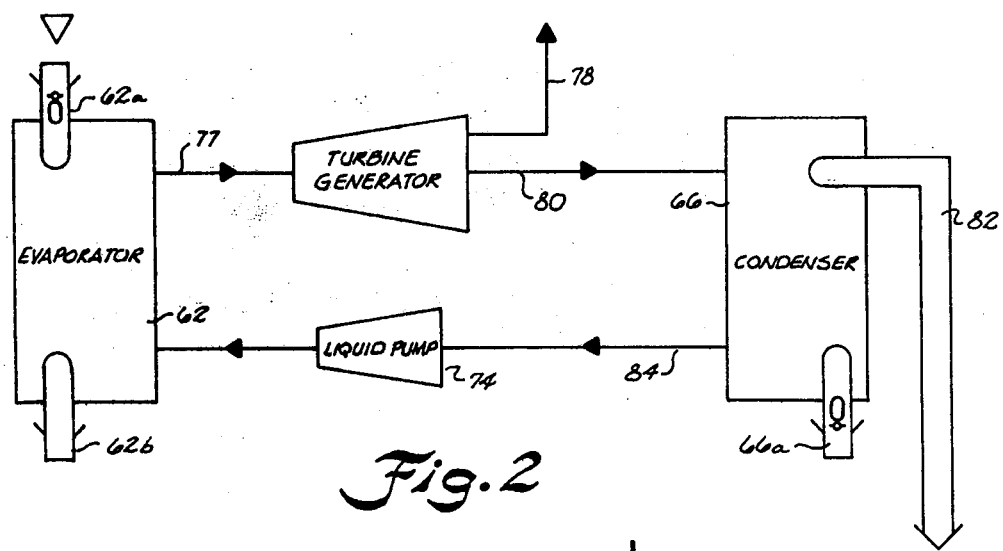
FIG. 2 is a schematic diagram illustrating a flow chart for the working fluid utilized in the system.

A schematic diagram of the flow of the working fluid through the power plant is illustrated in FIG. 2. A liquid pump 74 is used for pumping the working fluid from a reservoir 76 as illustrated in FIG. 3. The pump 74 pumps the liquid working fluid through the evaporator 62 where it is heated by the warm surface sea water flowing in entrance 62a and out of exit 62b for heating the working fluid and converting it to a gas. The working fluid in the gaseous state is then fed to the turbine generators by means of pipe 77. The gas causes the turbine to rotate which, in turn, rotates a generator for generating electricity. The electricity is fed from the generator by means of a cable 78. This cable is normally connected between the ocean thermal power plant and the shore so as to transport the electricity therebetween. Exhaust gases from the turbine are fed through tubes 80 into the condenser 66. Cold water being pumped into condenser 66 by pumps 73 is fed into one end of the condenser and exits the other end as indicated by the arrow 82. As the cold water flows through the condenser, it cools the pipes through which the gases are passing for converting the gases back to the liquid state. The liquid is, in turn, fed back through tubes 84 to the liquid reservoir. The cycle is then repeated.

The doors 70 provided in the walls of the tubular housing 10, have releasable connectors extending therearound for attaching the modular housings in which the condenser 66 and the evaporator 62 are carried. When the modular housings are removed from the main tubular housing 10, a hinged accordian styled door indicated by the reference character 70a is closed so as to prevent mixing of the various temperature waters possibly adversely affecting the operation of the thermal plant.

Positioned above each of the doors are three bifurcated support hinges 86 into which cooperating horizontally extending pins 88 carried on brackets 90 can rest so as to permit the housing to be pivoted into position. Vertically adjustable locking brackets 92 are provided below each of the doors so that after the modular housing has been brought flush against the wall of the tubular housing 10, the brackets may be raised by rotating bolts 94 for locking the bracket against a horizontally extending pin 96 carried on brackets 98 provided on the bottom of the modular housings. The brackets can be raised and lowered within a vertically extending slot, not shown.

Guide pins 100 extend around the periphery of the door and when the modular housing is placed in position, extend through openings provided in flanges 102 carried on the modular housings. This insures proper positioning of the modular housing relative to the door.

After the modular housing is in position, latching mechanisms, generally designated by the reference character 104, are pivoted for securing the modular housing to the wall 10 of the vertically extending tubular housing. The latching mechanism includes a rotatable handle 106 that is carried on a shaft 108. The shaft 108 has on it a pair of cams 110 and 112 which are forced against each other by a spring 114. Thus, as a result of the cams 110 and 112, when the handle 106 is rotated clockwise, it causes the inwardly extending arm 116 to be pivoted outwardly and in a clockwise direction.

Connected to the inner end of the arms 116 are vertically extending locking bars 118. When the modular housings are in position, these vertically extending locking bars press against the flange 102 carried on the modular housing forcing it flush against an inflatable seal 120. The inflatable seal 120 is interposed between the walls 10 and the inside of flange 102 provided on the modular housing. Such is best illustrated in the lower portion of FIG. 5.

Figure 5:
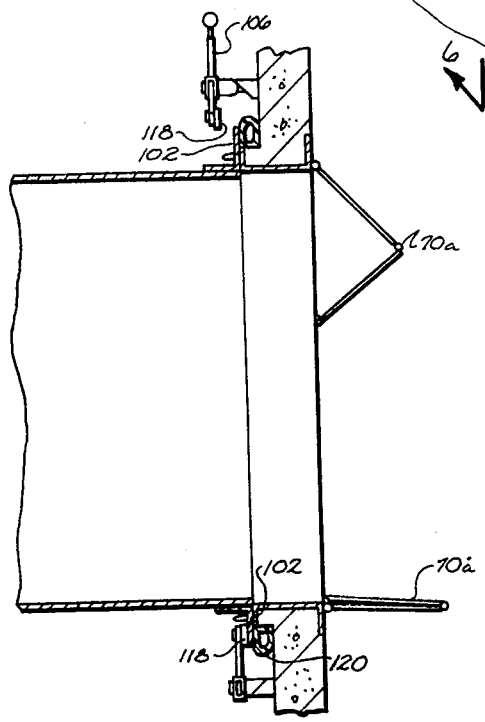
FIG. 5 is a sectional view taken along line 5—5 with a modular housing in position over one of the access doors.
Figure 6:
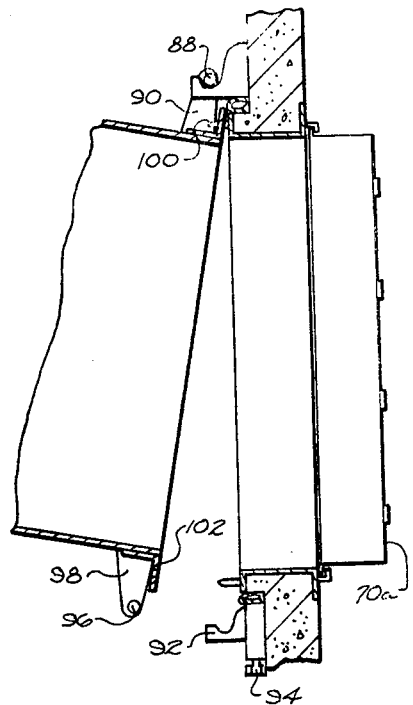
FIG. 6 is a sectional view taken along line 6—6 of FIG. 4 illustrating a modular housing being swung into position on the main vertical extending housing of the ocean thermal power plant.

When it is desired to change a modular unit, the doors 70a are closed and the latching means is rotated clockwise to the position such as illustrated in the upper portion of FIG. 5. In this position, the vertically extending elongated plate 118 is moved outwardly and laterally of the flanges 102 so as to permit the modular housing to be removed.

Figure 7:
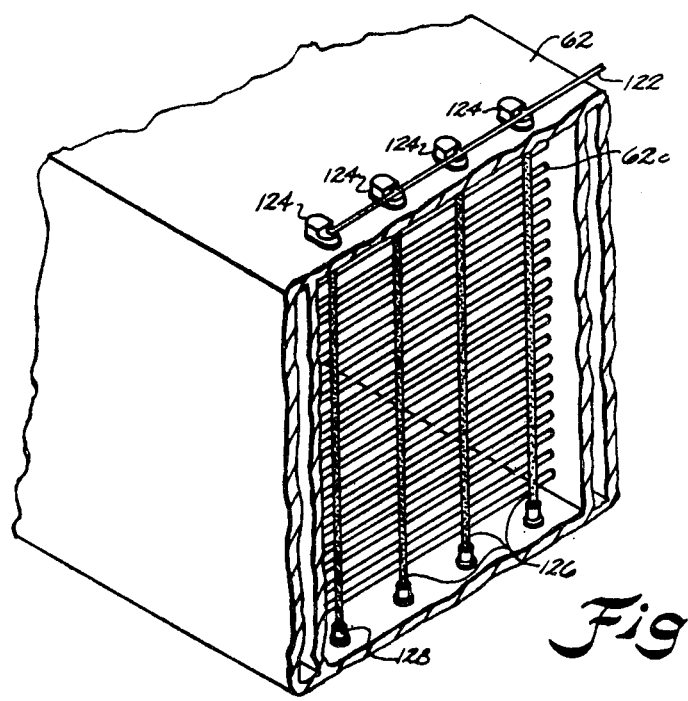
FIG. 7 is an enlarged perspective view with parts broken away for purposes of clarity illustrating a biofouling device mounted on an evaporator.
Figure 8:
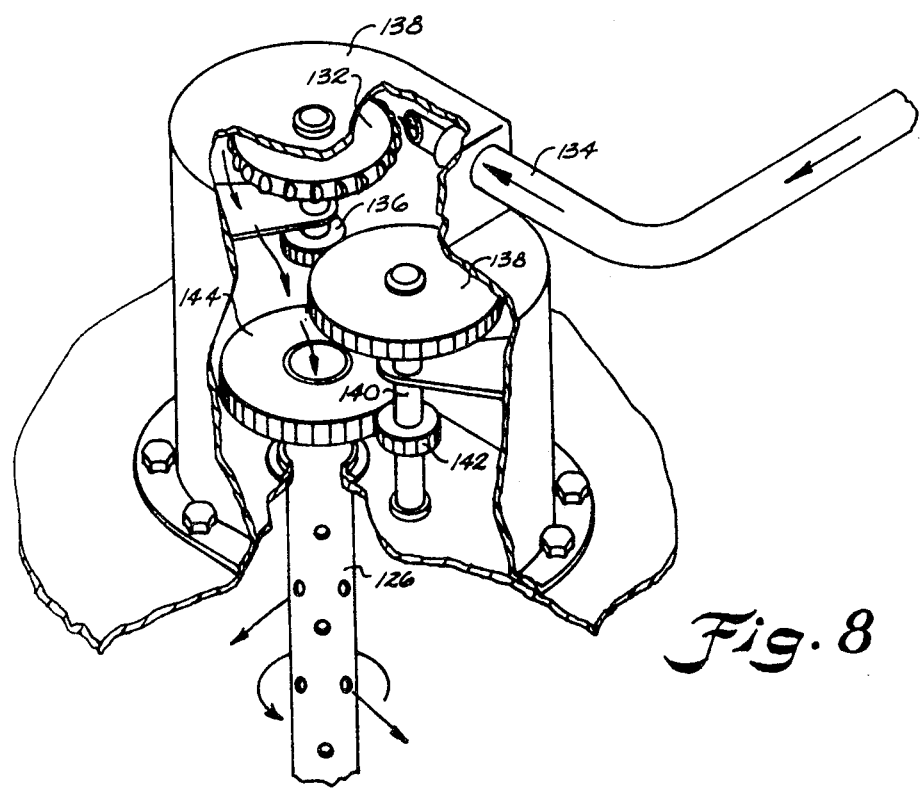
FIG. 8 is an enlarged perspective view, with parts broken away, illustrating the drive mechanism for a biofouling device.

The problems encountered with operating machinery in and around the ocean include the detrimental effects of the highly corrosive minerals and the biofouling of the working components that often takes place. It is desired that any marine growth that occurs on, for example, the tubes in the evaporator or condenser, be removed during operation so as to maintain the efficiency at its maximum. In one particular embodiment, this is accomplished by means of high pressure spray tubes. As illustrated in FIG. 7, a portion of the evaporator 62 is shown having tubes 62c extending therethrough. These tubes would normally be used for transporting the working fluid through the evaporator. It is important to maintain these tubes free from any marine growth or corrosion.

The biofouling means includes a plurality of individual spraying devices. A pressurized fluid, or in some instances, a chemical is fed through pipe 122 to drive heads 124 provided for each particular vertically extending perforated spray tube 126. The drive heads are provided for rotating the vertical spray tubes 126 as fluid is expelled therefrom for spraying the pressurized fluid against the adjacent pipe for dislodging any marine growth therefrom. The lower ends of the pipes 126 are journalled in bearings 128. The drive mechanisms for the vertically extending pipes 126 include a housing 130 in which a rotatable turbine 132 is carried. The pressurized liquid entering the housing through the pipe 134 impinges upon blades carried on the rotatable turbine 132 rotating the turbine. Fixed to the same shaft that turbine 132 is fixed is a first gear 136. This gear 136 meshes with a larger gear 138 for rotating it. The larger gear 138, in turn, rotates shaft 140 and small gear 142. The small gear 142 meshes with a larger gear 144 carried on top of the vertically extending perforated tube 126 for causing the tube 126 to be rotated. The pressurized fluid entering the housing 130 rotates the perforated tube 126 and flows through the center of gear 144 into the tube 126 after impinging upon the blades of the rotatable member 132.

These spray units are spaced throughout the evaporator and/or condenser for spraying the fluid on any components wherein it is desired to dislodge or prevent marine growth therefrom.

While a preferred embodiment of the invention has been described using specific terms, such description is for illustrative purposes only, and it is to be understood that changes and variations may be made without departing from the spirit or scope of the following claims.

What is claimed is:

1. In an apparatus for obtaining electrical power utilizing the difference in temperature between naturally heated surface sea water and cold water from greater depths, a vertically extending tubular housing having an upper inlet adjacent the top portion thereof for receiving warm sea water from adjacent the water surface and a lower inlet adjacent the bottom portion thereof for receiving colder water from a greater depth, a power generating means having a turbine for rotating an electrical generator that generates electricity, an evaporator for heating a working fluid with said warm sea water causing said working fluid to change from a liquid to a gas for rotating said turbine, and a condenser for cooling the gas exhausted from said turbine with said cold sea water to change said gas back to a liquid, the improvement comprising:
   (a) said power generating means being located in said top portion of said tubular housing at a point above said upper inlet,
   (b) a partition positioned horizontally in said tubular housing at a point below said upper inlet for isolating said warm sea water from said cold sea water,
   (c) a first modular housing communicating with said tubular housing at a point above said partition for receiving and exhausting said warm sea water from said tubular housing,
   (d) said evaporator being carried in said first modular housing so that said working fluid is converted from a liquid in said evaporator to a gas by said warm sea water flowing therethrough,
   (e) a second modular housing communicating with said tubular housing at a point below said partition for receiving and exhausting said cold sea water from said tubular housing, and
   (f) said condenser being carried in said second modular housing for receiving said gas exhausted from said turbine and utilizing said cold sea water to convert said gas back to said liquid.

2. The apparatus as set forth in claim 1 further comprising:
   (a) a rotatable tubular water deflecting hood carried adjacent the bottom of said tubular housing having one end communicating with said lower inlet and another end extending outwardly,
   (b) vane means carried on said rotatable water deflecting hood for rotating said hood so as to maintain it facing the flow of said cool sea water at said greater depth.

3. The apparatus as set forth in claim 1 further comprising:
   (a) a tubular outwardly extending warm water inlet housing carried by said tubular housing in communication with said upper inlet,
   (b) a pivotal duct carried on an outer end of said warm water inlet housing, and
   (c) means carried on said pivotal duct for aiding in maintaining said pivotal duct facing the flow of said warm sea water.

4. The apparatus as set forth in claim 3 further comprising:
   (a) a flexible connection between said warm water inlet housing and said vertically extending tubular housing,
   (b) ballast tanks carried by said warm water inlet housing for aiding in supporting said inlet housing at a predetermined depth below the surface of said warm sea water.

5. The apparatus as set forth in claim 1 further comprising:
   (a) releasable connectors carried on said tubular housing for securing said modular housings to said tubular housing, and
   (b) doors carried on said tubular housing between said modular housings and said tubular housing, whereby said doors can be opened for permitting water to flow through said tubular housing into and through said modular housings and can be closed for permitting said modular housings to be removed.

6. The apparatus as set forth in claim 5 wherein:
   (a) said modular housings having outwardly extending flanges carried on an inner end thereof, and
   (b) said releasable connector including:
      (i) latching means carried by said tubular housing for abutting against said flanges on said modular housings for securing said modular housings to said tubular housing, and
      (ii) an inflatable seal means carried between said tubular housing and said flanges on said modular housings for providing a seal between said inner end of said modular housing and said tubular housing.

7. The apparatus as set forth in claim 6 wherein said latching means includes:
   (a) vertically extending bars carried on opposite sides of said modular housings;
   (b) means for pivoting said bars over said flanges of said modular housing and towards said vertically extending tubular housing for securing said modular housings to said vertically extending tubular housing.

8. The apparatus as set forth in claim 6 further comprising:

(a) bifurcated supports carried on said vertically extending tubular housing above said doors, (b) horizontal support rods carried on said modular housings for extending into and on said bifurcated supports for permitting said modular housings to be swung into position on said vertically extending tubular housing, and (c) aligning pins extending outwardly from said vertically extending tubular housing for extending through aligning holes provided in said flanges on said modular housings for aligning said modular housings with said doors.

9. The apparatus as set forth in claim 1 further comprising:

(a) said evaporator having a plurality of rows of tubes carried therein through which said working fluid flows, (b) a biofouling means spraying fluid under pressure on said rows of tube for dislodging marine growth from said tubes.

10. The apparatus as set forth in claim 9 wherein said biofouling means comprises:

(a) a plurality of individual spraying devices positioned in said evaporator, (b) each of said spraying devices includes:
  (i) an elongated vertically extending perforated tubular member,
  (ii) means for rotating said tubular member, and
  (iii) means for supplying pressurized fluid to said tubular member for spraying said fluid outwardly therefrom onto surrounding tubes in said evaporator.

11. In an apparatus for obtaining electrical power utilizing the difference in temperature between naturally heated surface sea water and cold water from greater depths, a vertically extending tubular housing having an upper inlet adjacent the top portion thereof for receiving warm sea water from adjacent the water surface and a lower inlet adjacent the bottom portion thereof for receiving colder water from a greater depth, a power generating means having a turbine for rotating an electrical generator that generates electricity, an evaporator for heating a working fluid with said warm sea water causing said working fluid to change from a liquid to a gas for rotating said turbine, and a condenser for cooling said gas exhausted from said turbine with said cold sea water to change said gas back to a liquid, the improvement comprising:

(a) a first modular housing communicating with an upper portion of said tubular housing for receiving said warm sea water from said tubular housing, (b) said evaporator being carried in said first modular housing so that said working fluid is converted from a liquid in said evaporator to a gas by said warm sea water flowing therethrough, (c) a second modular housing communicating with a lower portion of said tubular housing for receiving said colder sea water from said tubular housing, and (d) said condenser being carried in said second modular housing communicating with a lower portion of said tubular housing for receiving said gas exhausted from said turbine and utilizing said colder sea water to convert said gas back to a liquid, (e) releasable connectors carried on said vertically extending housing for securing said modular housings to said vertically extending housing, and (f) doors carried on said vertically extending housing between said modular housings and said vertically extending housing, whereby said doors can be opened for permitting water to flow through said vertically extending housings into and through said modular housing and can be closed for permitting said modular housings to be removed.

12. In an apparatus for obtaining electrical power utilizing the difference in temperature between naturally heated surface sea water and cold water from greater depths, a vertically extending tubular housing having an upper inlet adjacent the top portion thereof for receiving warm sea water from adjacent the water surface and a lower inlet adjacent the bottom portion thereof for receiving colder water from greater depths, a power generating means having a turbine for rotating an electrical generator that generates electricity, an evaporator for heating a working fluid with said warm sea water causing said working fluid to change from a liquid to a gas for rotating said turbine, and a condenser for cooling said gas exhausted from said turbine with said cold sea water to change said gas back to a liquid, the improvement comprising:

(a) a first modular housing communicating with an upper portion of said tubular housing for receiving said warm sea water from said tubular housing, (b) said evaporator being carried in said first modular housing so that said working fluid is converted from a liquid in said evaporator to a gas by said warm sea water flowing therethrough, (c) a second modular housing communicating with a lower portion of said tubular housing for receiving said colder sea water from said tubular housing, (d) said condenser being carried in said second modular housing communicating with a lower portion of said tubular housing for receiving said gas exhausted from said turbine and utilizing said colder sea water to convert said gas back to a liquid, (e) a tubular outwardly extending warm water inlet housing carried by said vertically extending housing in communication with said upper inlet, (f) a pivotal duct carried on an outer end of said warm water inlet housing, and (g) vane means carried on said pivotal duct for aiding in maintaining said pivotal duct facing the flow of said warm water.

13. The apparatus as set forth in claim 11 wherein:

(a) said modular housings having outwardly extending flanges carried on an inner end thereof, and (b) said releasable connector including:
  (i) latching means carried by said vertically extending housing for abutting against said flanges on said modular housings for securing said modular housings to said vertically extending housing, and
  (ii) an inflatable seal means carried between said vertically extending housing and said flanges on said modular housings for providing a seal between said inner end of said modular housing and said vertically extending housing.

* * * * *